US010756620B2

(12) United States Patent
Viswanathan et al.

(10) Patent No.: US 10,756,620 B2
(45) Date of Patent: Aug. 25, 2020

(54) ZERO CURRENT AND VALLEY DETECTION FOR POWER FACTOR CORRECTION

(71) Applicant: Texas Instruments Incorporated, Dallas, TX (US)

(72) Inventors: Ananthakrishnan Viswanathan, Allen, TX (US); Salvatore Giombanco, Cassaro (IT); Joseph Michael Leisten, Cork (IE); Philomena Cleopha Brady, Corinth, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/525,790

(22) Filed: Jul. 30, 2019

(65) Prior Publication Data
US 2019/0356219 A1    Nov. 21, 2019

Related U.S. Application Data

(63) Continuation of application No. 15/854,467, filed on Dec. 26, 2017, now Pat. No. 10,411,592.

(51) Int. Cl.
| *H02M 1/00* | (2006.01) |
|---|---|
| *H02M 1/42* | (2007.01) |
| *H02M 7/06* | (2006.01) |
| *H02M 7/217* | (2006.01) |

(52) U.S. Cl.
CPC ....... *H02M 1/4208* (2013.01); *H02M 1/4225* (2013.01); *H02M 7/06* (2013.01); *H02M 7/217* (2013.01); *H02M 2001/0009* (2013.01); *H02M 2001/0054* (2013.01); *H02M 2001/0058* (2013.01)

(58) Field of Classification Search
CPC ............... H02M 1/4208; H02M 7/217; H02M 2001/0009
See application file for complete search history.

(56) References Cited

U.S. PATENT DOCUMENTS

| 10,411,592 B2 * | 9/2019 | Viswanathan ...... H02M 1/4208 |
| 2015/0323949 A1 | 11/2015 | Saint-Pierre |

* cited by examiner

*Primary Examiner* — Adolf D Berhane
*Assistant Examiner* — Afework S Demisse
(74) *Attorney, Agent, or Firm* — Lawrence J. Bassuk; Charles A. Brill; Frank D. Cimino

(57) ABSTRACT

A power factor correction circuit includes a power transistor, an inductor, and detection circuitry. The inductor is coupled to a drain terminal of the power transistor. The detection circuitry is coupled to the drain terminal of the power transistor. The detection circuitry is configured to determine an input voltage applied to the inductor based on resonant ringing of voltage at the drain terminal, and to detect a valley in the voltage at the drain terminal based on the input voltage applied to the inductor.

20 Claims, 4 Drawing Sheets

ZERO CURRENT AND VALLEY DETECTION FOR POWER FACTOR CORRECTION

CROSS-REFERENCE TO RELATED APPLICATIONS

Under 35 U.S.C. § 120, this continuation application claims benefits of and priority to U.S. patent application Ser. No. 15/854,467, filed on Dec. 26, 2017, the entirety of which are hereby incorporated herein by reference.

BACKGROUND

Electrical power supplies commonly use diode rectifier circuits to convert from alternating current (AC) to direct current (DC). A diode rectifier conducts current only when the input voltage of the rectifier exceeds the output voltage of the rectifier, so a sinusoidal input voltage results in intermittent non-sinusoidal current flow. The intermittent current flow has a primary frequency component equal to the AC input frequency and substantial energy at integer multiples of the AC input frequency (harmonics). Input current harmonics can cause transient current flow in the AC mains, which can increase the power required from the AC mains and can cause heating of the distribution system. In addition, input current harmonics create electrical noise that can interfere with other systems connected to the AC mains.

The power factor of a power supply is the ratio of the real power delivered to a load divided by the apparent input power, where the apparent input power is the Root-Mean-Square (RMS) input voltage times RMS input current. In general, input current harmonics cause the RMS value of the input current to be substantially higher than the current delivered to the load. Many power supplies include power factor correction to reduce input current harmonics. Power factor correction refers to a process to offset or improve the undesirable effects of non-linear electric loads that contribute to a power factor that is less than unity. These effects involve the phase angle between the voltage and the harmonic content of the current. When the voltage and current are in phase, the power factor is unity, but when the voltage and current are not in phase the power factor is some value less than one.

SUMMARY

A method and apparatus for controlling power factor correction using the drain signal of a power transistor driving an inductor that lacks an auxiliary winding are disclosed herein. In one embodiment, a power factor correction circuit includes a power transistor, an inductor, and detection circuitry. The inductor is coupled to a drain terminal of the power transistor. The detection circuitry is coupled to the drain terminal of the power transistor. The detection circuitry is configured to determine an input voltage applied to the inductor based on resonant ringing of voltage at the drain terminal, and to detect a valley in the voltage at the drain terminal based on the input voltage applied to the inductor.

In another embodiment, a method for controlling power factor correction includes driving an inductor coupled to a drain terminal of a power transistor. The method also includes determining, by detection circuitry coupled to the drain terminal, an input voltage applied to the inductor based on resonant ringing of voltage at the drain terminal. The method further includes detecting an edge in the voltage at the drain terminal based on the input voltage applied to the inductor, and identifying a valley in the voltage at the drain terminal based on the detected edge. The method yet further includes providing a signal indicative of the valley to circuitry that controls activation of the power transistor.

In a further embodiment, a power factor correction controller includes a transistor driver and detection circuitry. The transistor driver is configured to drive a power transistor. The detection circuitry is configured for connection to the drain terminal of the power transistor. The detection circuitry is configured to determine, based on resonant ringing of voltage at the drain terminal of the power transistor, an input voltage applied to an inductor coupled to the drain terminal of the power transistor. The detection circuitry is also configured to detect an edge in the voltage at the drain terminal based on the input voltage applied to the inductor, and identify a valley in the voltage at the drain terminal based on the edge. The power factor correction controller is configured to drive a control terminal of the power transistor based on the valley.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Power factor correction based on valley switching offers a number of advantages. For example, use of valley switching in power factor correction can improve operating efficiency and reduce electro-magnetic interference. However, use of valley switching presents a variety of issues. Imprecise detection of valleys increases the risk of audible noise, and valley switching may not work well if the difference between the input and output voltages is small. Furthermore, conventional valley detection uses an auxiliary winding which increases system cost.

Embodiments of the present disclosure provide power factor correction using valley detection without inclusion of an auxiliary winding. Accordingly, the embodiments disclosed herein reduce the cost and complexity of power factor correction circuitry. The power factor correction circuits disclosed herein monitor the voltage on the drain terminal of a power transistor. Embodiments differentiate the drain voltage signal and identify a time at which the slope of the drain terminal voltage changes. The time corresponding to change in slope identifies a falling edge in the drain voltage signal. Embodiments also determine the average voltage of resonant ringing in the drain voltage signal. The average voltage of the resonant ringing corresponds to the input voltage provided to an inductor coupled to the power transistor. Embodiments compare the drain voltage signal to the input voltage (i.e., the average of the resonant ringing) to detect a falling edge in the resonant ringing. Embodiments identify a valley in the drain voltage signal based on the detected edge.

Figure 1:
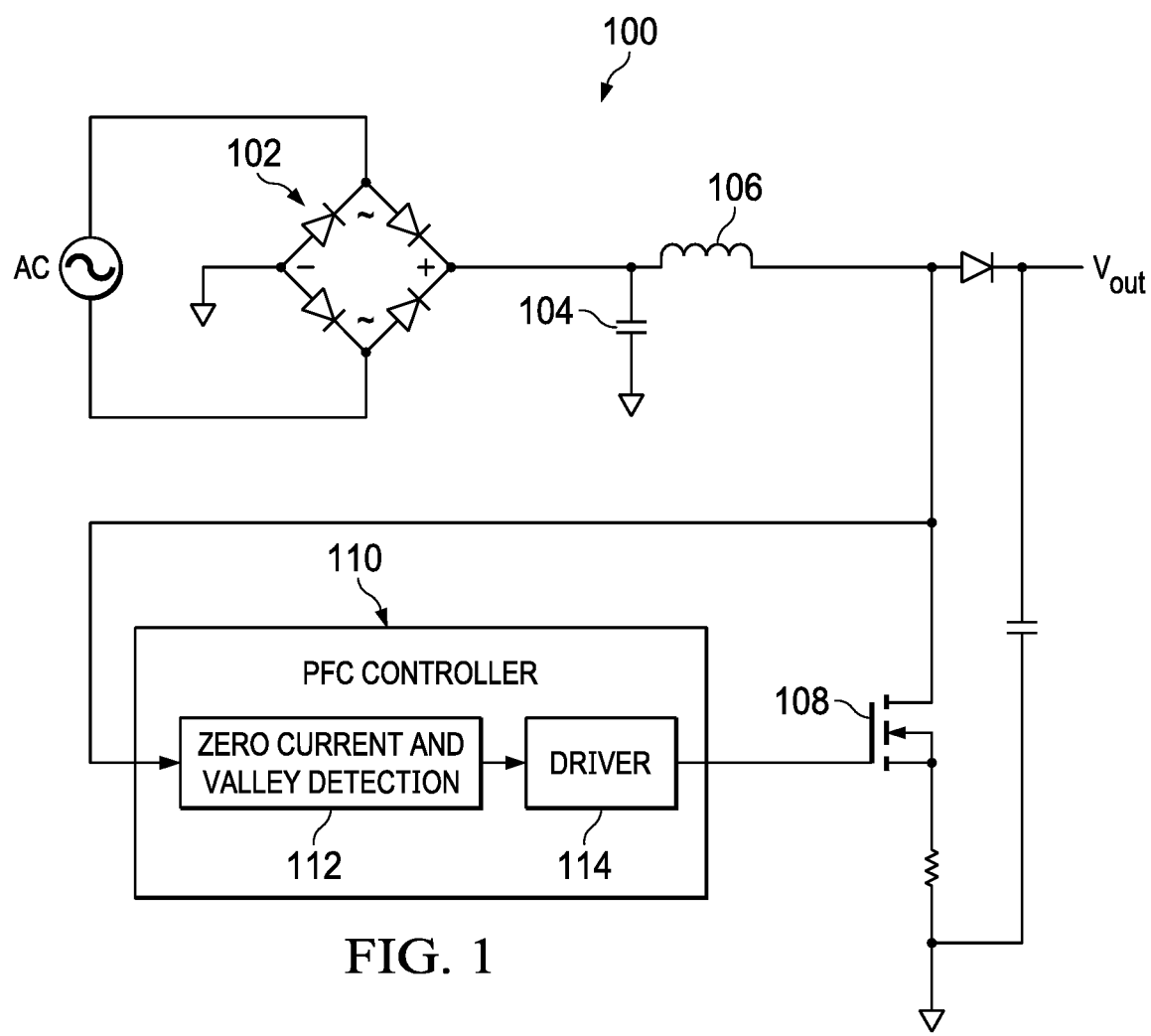
FIG. 1 shows a schematic diagram for power factor correction circuitry in accordance with various embodiments.

FIG. 1 shows a schematic diagram for power factor correction circuitry in accordance with various embodiments. The power factor correction circuitry 100 includes a rectifier 102, a filter capacitor 104, an inductor 106, a power transistor 108, and a power factor correction controller 110. Embodiments of the power factor correction circuitry 100 may include additional components that have been omitted from FIG. 1 in the interest of clarity. The rectifier 102 may a full-wave rectifier arranged as a diode bridge to convert an alternating current (AC) input voltage into a direct current (DC) output voltage. The output of the rectifier 102 is filtered by the capacitor 104 and the inductor 106 to enable a continuous input current. The power factor controller 110 drives the power transistor 108 using pulse-width-modulation or another modulation technique to control the DC output voltage $V_{OUT}$ and to generate a continuous sinusoidal input current in phase with the AC input voltage. The power transistor 108 may be a metal oxide semiconductor field effect transistor (MOSFET). The power factor correction controller 110 may operate in transition mode, discontinuous current mode, and/or burst mode. The output voltage $V_{OUT}$ may be provided to additional switch-mode power supply circuitry that is not shown in FIG. 1.

The power factor correction controller 110 includes detection circuitry 112 and driver circuitry 114. The driver circuitry 114 is coupled to the gate terminal of the power transistor 108, and generates a signal to activate the power transistor 108 as needed to perform power factor correction. The detection circuitry 112 is coupled to the drain terminal of the power transistor 108. The detection circuitry 112 monitors the voltage at the drain terminal of the power transistor 108 to determine when the driver circuitry 114 is to activate or deactivate the power transistor 108. For example, the detection circuitry 112 may identify valleys (minima in the voltage of resonant ringing) in the voltage on the drain terminal and provide signals to the driver 114 that allow the driver 114 to activate the power transistor 108 during the valley. A valley may correspond to a time of minimum energy storage in the drain node capacitance of the power transistor 108, and activation of the power transistor 108 during a valley improves the efficiency of the power factor correction circuitry 100 by reducing switching losses in the power transistor 108.

The detection circuitry 112 may also detect when the current flowing in the inductor 106 falls to zero. The detection circuitry 112 may detect that the current flowing in the inductor 106 has fallen to zero by monitoring the voltage at the drain terminal of the power transistor 108, and identifying a negative slope in the voltage at the drain terminal after the power transistor 108 has been deactivated. After the detection circuitry 112 determines that inductor 106 current has fallen to zero, the detection circuitry 112 may initiate detection of valleys in the voltage at the drain terminal of the power transistor 108.

Figure 2:
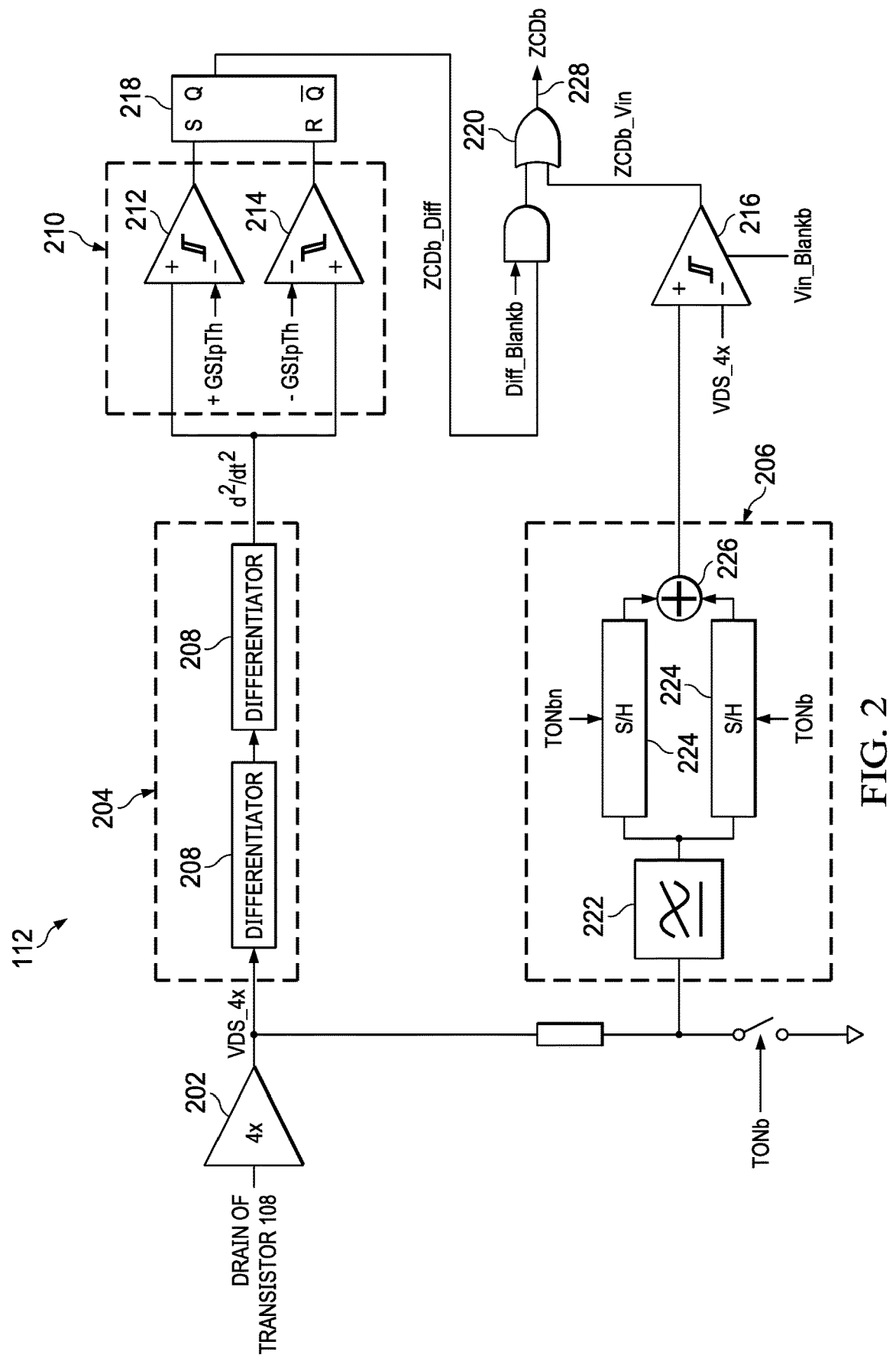
FIG. 2 shows a block diagram for detection circuitry used in power factor correction in accordance with various embodiments.

FIG. 2 shows a block diagram for the detection circuitry 112 in accordance with various embodiments. The detection circuitry 112 includes an amplifier 202, a differentiation circuit 204, an averaging circuit 206, a window comparator 210, a comparator 216, a flip-flop 218, and a gate 220. The amplifier 202 is coupled to the drain terminal of the power transistor 108, and applies a predetermined gain (e.g., a gain of four) to the voltage at the drain terminal. The output of the amplifier 202 is provided to the differentiation circuit 204 and the averaging circuit 206 for further processing.

The averaging circuit 206 includes a filter 222, sample and hold circuits 224, and a summation circuit 226. The averaging circuit 206 determines the average of the voltage at the drain terminal while the power transistor 108 is deactivated. More specifically, the averaging circuit 206 determines the average of the voltage at the drain terminal during the resonant ringing of the voltage at the drain terminal resulting from deactivation of the power transistor 108. The average voltage of the resonant ringing corresponds to the input voltage applied to the inductor 106. The detection circuitry 112 applies the average voltage produced by the averaging circuit 206 to identify zero crossings in the resonant ringing. The location of the valleys in the resonant ringing may be determined as a function of the zero crossings.

The filter 222 applies a low pass filter to the voltage at the drain terminal while the power transistor 108 is deactivated. The sample and hold circuits 224 sample the output of the filter 222 (i.e., sample the filtered voltage at the drain terminal of the power transistor 108), and the summation circuit 226 sums the outputs of the sample and hold circuits 224. Each of the sample and hold circuits 224 may include a switch and a capacitor. The switch is closed to connect the capacitor to the filter 222. When the switch is opened the voltage across the capacitor reflects the voltage at the output of the filter 222.

Figure 3:
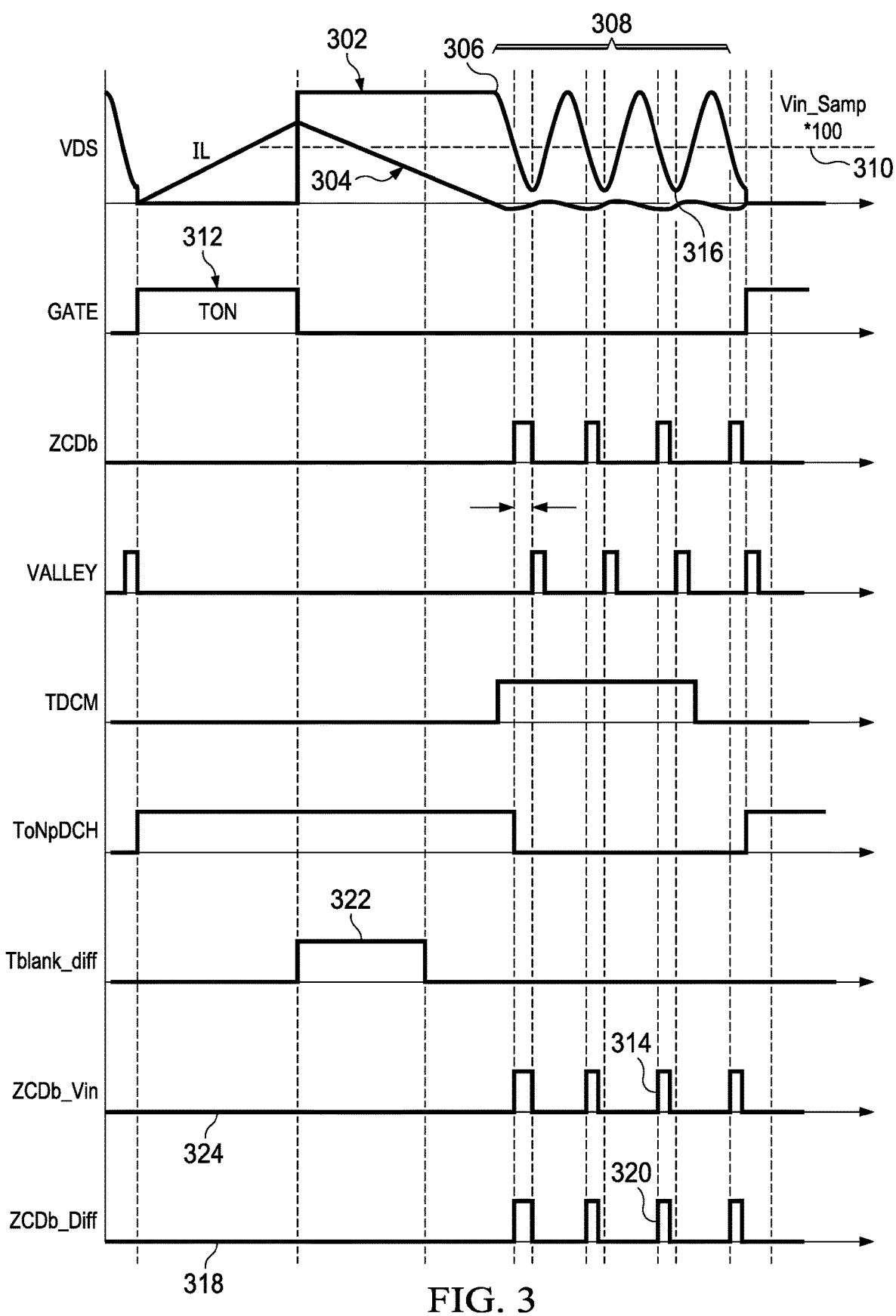
FIG. 3 shows signals generated in power factor correction circuitry in accordance with various embodiments.

FIG. 3 shows signals generated in the power factor correction circuitry 100 in accordance with various embodiments. In FIG. 3, the signal 302 represents the voltage at the drain terminal of the power transistor 108, and the signal 304 represents the current flowing in the inductor 106. The averaging circuit 206 averages the voltage of the resonant ringing 308 to produce the voltage 310 representing the voltage at the input of the inductor 106. The resonant ringing 308 is an oscillation starting at demagnetization of the inductor 106, and generated by interaction of the inductor 106 and the parasitic capacitance of the power transistor 108. The signal 312 represents the gate drive signal generated by the driver circuitry 114 to activate and deactivate the power transistor 108. The averaging circuit 206 may be enabled to average the voltage at the drain terminal of the drive transistor 108 during the time that the power transistor 108 is deactivated.

The output of the averaging circuit 206 is provided to the comparator 216. The comparator 216 compares the output of the amplifier 202 to the output of the averaging circuit 206. That is, the comparator 216 compares the average of the resonant ringing 308 to the resonant ringing 308. In FIG. 3, signal 324 represents the output of the comparator 216, where a leading edge of each pulse 314 corresponds to a time at which the voltage signal at the drain terminal of the power transistor 108 falls below the average of the voltage signal at the drain terminal of the power transistor 108. The timing of the valley 316 may be determined based on a predetermined timing relationship between the leading edge of the pulse 314 and the valley 316.

The differentiation circuit 204 receives the output of the amplifier 202 and differentiates the voltage at the drain terminal of the power transistor 108. Some embodiments of the differentiation circuit 204 include two differentiators 208. The differentiator 208 is a circuit that produces an output that is proportional to the derivative (the rate of change) of the signal input to the differentiator 208. The differentiator 208 may be constructed by connecting a capacitor to the input of an amplifier, such that input signals are provided to the amplifier through the capacitor. Two instances of the differentiator 208 may be connected in series to form a second order differentiation circuit 204 that produces the derivative (e.g., second derivative (rate of change of rate of change)) of the voltage at the drain terminal of the power transistor 108. The output of the differentiation circuit 204 is provided to the window comparator 210.

The window comparator 210 compares the output of the differentiation circuit 204 to predetermined threshold voltages. The window comparator 210 includes a comparator 212 and a comparator 214. The comparator 212 compares the output of the differentiation circuit 204 to a set threshold voltage. The comparator 214 compares the output of the differentiation circuit 204 to a reset threshold voltage. If the rate of change of the voltage at the drain terminal of the power transistor 108 changes at a rate that exceeds the rate represented by the set threshold voltage, then the output of the comparator 212 is asserted, and the flip-flop 218 is set. When the rate of change of the voltage at the drain terminal of the power transistor 108 changes at a rate that is less than the rate represented by the reset threshold voltage, then the output of the comparator 214 is asserted, and the flip-flop 218 is reset. The output of the flip-flop 218 is a pulse that identifies the edge (point of highest change rate) of each cycle of the resonant ringing 308. In FIG. 3, the signal 318 represents the output of the flip-flop 218, where a leading edge of each pulse 320 corresponds to a time at which the voltage signal at the drain terminal of the power transistor 108 is falling at a highest rate. The timing of the valley 316 may be determined based on a predetermined timing relationship between the leading edge of the pulse 320 and the valley 316.

The outputs of the flip-flop 218 and the comparator 216 are provided as signal 228 to the driver circuity 114 for use in identifying a valley 316 in the resonant ringing 308 of the voltage at the drain terminal of the power transistor 108.

The detection circuitry 112 may also include circuitry to identify the end of demagnetization of the inductor 106 (i.e., to identify the knee 306). For example, the knee 306 may be identified based on the output of the differentiation circuit 204 indicating an increase in rate of change of the voltage 302 at the drain terminal of the power transistor 108 after expiration of the blanking time 322. After detection of the knee 306, the output 228 of the detection circuit 112 may be applied to identify valleys in the voltage 302 at the drain terminal of the power transistor 108.

Figure 4:
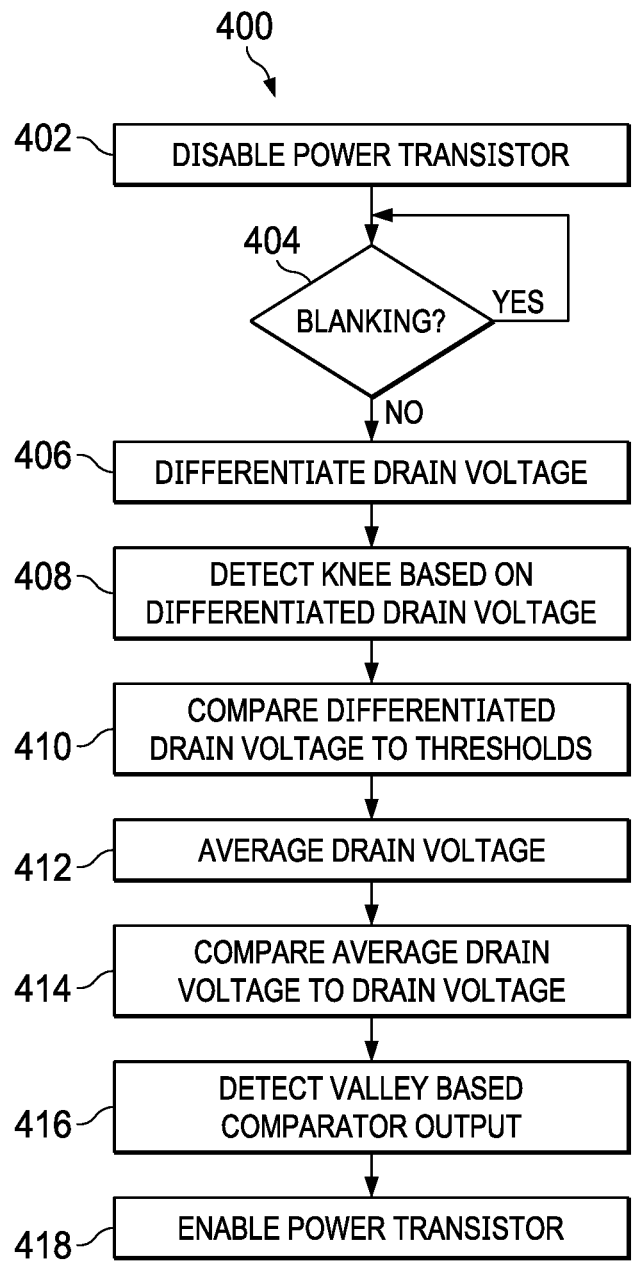
FIG. 4 shows a flow diagram for a method for power factor correction in accordance with various embodiments.

FIG. 4 shows a flow diagram for a method 400 for power factor correction in accordance with various embodiments. Though depicted sequentially as a matter of convenience, at least some of the actions shown can be performed in a different order and/or performed in parallel. Additionally, some implementations may perform only some of the actions shown. In some implementations, at least some of the operations of the method 400 can be implemented by the power factor correction circuitry 100 and/or the detection circuitry 112. At initiation of the method 400, the power transistor 108 is driving the inductor 106, which is coupled to the drain terminal of the power transistor 108.

In block 402, the power transistor 108 is deactivated. For example, the power factor correction controller 110 may negate the gate drive signal 312 causing the power transistor 108 to turn off. Turning off the power transistor 108 causes current flow through the inductor 106 to cease, and the magnetic field about the inductor 106 begins to collapse.

In block 404, the detection circuitry 112 is monitoring the voltage on the drain terminal of the power transistor 108. The detection circuitry 112 determines whether the blanking time has expired. The blanking time defines when the ringing triggered by deactivation of the power transistor 108 has subsided. For example, each detected oscillation peak of ringing after the power transistor 108 is deactivated may reset a timer, where expiration of the timer indicates cessation of ringing. On expiration of the blanking time 322, the detection circuitry 112 initiates monitoring for knee and valley occurrence.

In block 406, the detection circuitry 112 differentiates the voltage at the drain terminal of the power transistor 108. The differentiation may include applying a second order differentiator to the voltage (or an amplified version thereof) at the drain terminal of the power transistor 108. Differentiating the voltage at the drain terminal includes differentiating the resonant ringing 308 to produced differentiated resonant ringing.

In block 408, the detection circuitry 112 applies the derivative of the voltage at the drain terminal of the power transistor 108 to identify the knee in the voltage at the drain terminal of the power transistor 108. The detection circuitry 112 may identify the knee as a voltage of the differentiator output exceeding a threshold.

In block 410, the knee 306 has been detected in block 408, and the detection circuitry 112 compares the derivative of the voltage at the drain of the power transistor 108 to the set threshold voltage and the reset threshold voltage to identify edges of cycles of resonant ringing 308. Embodiments may apply the window comparator 210 to compare the derivative of the voltage at the drain of the power transistor 108 to the set threshold voltage and the reset threshold voltage.

In block 412, the detection circuitry 112 (e.g., via the averaging circuit 206) processes the voltage at the drain terminal of the power transistor 108 to determine the average of the voltage at the drain terminal. The average of the resonant ringing 308 corresponds to the voltage input to the inductor 106.

In block 414, the detection circuitry 112 compares the average of the resonant ringing 308 to the voltage at the drain terminal of the power transistor 108. For example, the comparator 216 may compare the average voltage 310 of the resonant ringing 308 to the resonant ringing 308 at the drain terminal of the power transistor 108.

In block 416, the power factor correction controller 110 identifies the valleys in the resonant ringing 308 based on the comparison of the average voltage during the resonant ringing 308 to the resonant ringing 308 and/or the comparison of the derivative of the resonant ringing 308 to the set threshold voltage and the reset threshold voltage. For example, the valleys may be identified as occurring at a predetermined time from an edge of the signal 228.

In block 418, the driver circuitry 114 activates the power transistor 108 based on the valley detected in block 416.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A power factor correction circuit, comprising:
a power transistor having a drain terminal;
an inductor coupled to the drain terminal of the power transistor; and
detection circuitry coupled to the drain terminal of the power transistor, the detection circuitry configured to:
determine a value of an input voltage applied to the inductor based on a resonant ringing of a voltage at the drain terminal; and
detect a valley in the resonant ringing of the voltage at the drain terminal based on the value of the input voltage applied to the inductor; and
a driver configured to drive the power transistor based on the detected valley.

2. The power factor correction circuit of claim 1, in which the detection circuitry includes an averaging circuit configured to determine the value of input voltage applied to the inductor as an average of the resonant ringing of the voltage at the drain terminal.

3. The power factor correction circuit of claim 2, in which the detection circuitry includes an amplifier configured to apply a gain to the voltage at the drain terminal;
in which an output of the amplifier is provided to the averaging circuit.

4. The power factor correction circuit of claim 2, in which the averaging circuit includes:
a sample and hold circuit configured to sample a filtered version of the voltage at the drain terminal; and
a summation circuit configured to sum samples output by the sample and hold circuit.

5. The power factor correction circuit of claim 2, in which the detection circuitry includes a comparator configured to compare the average of the resonant ringing to the voltage at the drain terminal.

6. The power factor correction circuit of claim 1, in which the detection circuitry includes a differentiation circuit configured to generate a derivative of the voltage at the drain terminal.

7. The power factor correction circuit of claim 6, in which the differentiation circuit includes a first differentiator in series with a second differentiator.

8. The power factor correction circuit of claim 6, in which the detection circuitry is configured to:
compare output of the differentiation circuit to a threshold voltage; and
identify an edge in the resonant ringing of the voltage at the drain terminal based on the output of the differentiation circuit exceeding the threshold voltage.

9. The power factor correction circuit of claim 8, in which the voltage threshold represents a predetermined rate of change of the voltage at the drain terminal.

10. A process for controlling power factor correction, comprising: determining, by detection circuitry coupled to a drain terminal of a power transistor, an input voltage applied to an inductor based on a resonant ringing of a voltage at the drain terminal while the power transistor is deactivated: detecting a point of highest change rate in the resonant ringing of the voltage at the drain terminal based on the input voltage applied to the inductor; identifying a valley in the resonant ringing of the voltage at the drain terminal based on the detected edge; and activating the power transistor based on the identified valley.

11. The process of claim 10, including determining the input voltage applied to the inductor by averaging the resonant ringing of the voltage at the drain terminal.

12. The process of claim 11, including amplifying the voltage at the drain terminal prior to the averaging.

13. The process of claim 11, including:
sampling a filtered version of the voltage at the drain terminal; and
summing samples of the voltage to perform the averaging.

14. The process of claim 11, including comparing the average of the resonant ringing to the voltage at the drain terminal.

15. The process of claim 10, including differentiating the voltage at the drain terminal.

16. The process of claim 15, including
comparing the differentiated resonant ringing of the voltage at the drain terminal to a threshold voltage; and
identifying the edge in the resonant ringing of the voltage at the drain terminal based on a result of the comparing.

17. A power factor correction controller, comprising: a transistor driver configured to drive a power transistor; and detection circuitry configured for connection to a drain terminal of the power transistor, the detection circuitry configured to: determine, based on a resonant ringing of a voltage at the drain terminal of the power transistor, an input voltage applied to an inductor coupled to the drain terminal of the power transistor; detect a point of highest change rate in the resonant ringing of the voltage at the drain terminal based on the input voltage applied to the inductor; and identify a valley in the resonant ringing of the voltage at the drain terminal based on the edge; which the transistor driver is configured to drive a control terminal of the power transistor based on the identified valley.

18. The power factor correction controller of claim 17, in which the detection circuitry includes an averaging circuit configured to determine the input voltage applied to the inductor as an average of the resonant ringing of the voltage at the drain terminal, the averaging circuit including:
a sample and hold circuit configured to sample a filtered version of the voltage at the drain terminal; and
a summation circuit configured to sum samples output by the sample and hold circuit.

19. The power factor correction controller of claim 17, in which the detection circuitry includes a differentiation circuit configured to differentiate the voltage at the drain terminal, the differentiation circuit including a first differentiator in series with a second differentiator.

20. The power factor correction controller of claim 19, including:
a comparator configured to compare output of the differentiation circuit to a threshold voltage; and
circuitry configured to identify the edge in the voltage at the drain terminal based on the output of the differentiation circuit exceeding the threshold voltage.

* * * * *